(12) United States Patent
Holmström et al.

(10) Patent No.: US 6,907,265 B1
(45) Date of Patent: Jun. 14, 2005

(54) SUPPLY OF INSTANT GPRS TO MOBILE PHONE MANUFACTURERS

(75) Inventors: Tomas Jarl Holmström, Dalby (SE); Ramon Van Der Winkel, Malmö (SE)

(73) Assignee: Telefonaktiebolaget LM Ericsson, Stockholm (DE)

( * ) Notice: Subject to any disclaimer, the term of this patent is extended or adjusted under 35 U.S.C. 154(b) by 0 days.

(21) Appl. No.: 09/144,079

(22) Filed: Aug. 31, 1998

(51) Int. Cl.[7] .................................................. H04Q 7/20
(52) U.S. Cl. .................. 455/557; 455/466; 455/556.1; 455/422.1; 455/426.1; 375/222; 370/352; 370/465
(58) Field of Search ................................ 455/422, 426, 455/500, 507, 509, 517, 422.1, 426.1, 556.1, 2, 557, 558, 466; 370/336, 349, 352, 465; 375/222

(56) References Cited

U.S. PATENT DOCUMENTS

| | | | |
|---|---|---|---|
| 5,335,267 A | 8/1994 | Evers et al. ................ 379/100 |
| 5,408,520 A | 4/1995 | Clark et al. ................. 379/93 |
| 5,428,671 A | 6/1995 | Dykes et al. ................ 379/93 |
| 5,483,531 A | 1/1996 | Jouin et al. ................. 370/79 |
| 5,742,592 A | * 4/1998 | Scholefield et al. ........ 370/329 |
| 5,790,952 A | * 8/1998 | Seazholtz et al. ........... 455/432 |
| 5,793,843 A | 8/1998 | Morris ........................ 379/59 |
| 5,864,560 A | * 1/1999 | Li et al. ................. 375/222 X |
| 5,920,821 A | * 7/1999 | Seazholtz et al. ........... 455/466 |
| 5,940,383 A | * 8/1999 | Willkie ....................... 370/336 |

FOREIGN PATENT DOCUMENTS

| | | |
|---|---|---|
| GB | 2 295 523 | 5/1996 |
| WO | WO97/28661 | 8/1997 |

* cited by examiner

*Primary Examiner*—Nay Maung
*Assistant Examiner*—Philip J. Soburka
(74) *Attorney, Agent, or Firm*—Burns, Doane, Swecker & Mathis, L.L.P.

(57) ABSTRACT

The present invention provides a system and method for instantly providing a packet-switched connection, e.g., GPRS, to a portable computer of an existing mobile station. According to exemplary embodiments of the present invention, a GPRS identifier is added to a modem's standard AT dial command in order to indicate that GPRS is requested. The modification to the modem's dial command is made in such a way so as to be compliant with the well known syntax rules set forth for that command. By modifying the modem's AT command set accordingly, an existing mobile station's portable computer will be capable of instantly supporting GPRS irrespective of the off-the-shelf operating system in use in the portable computer.

15 Claims, 3 Drawing Sheets

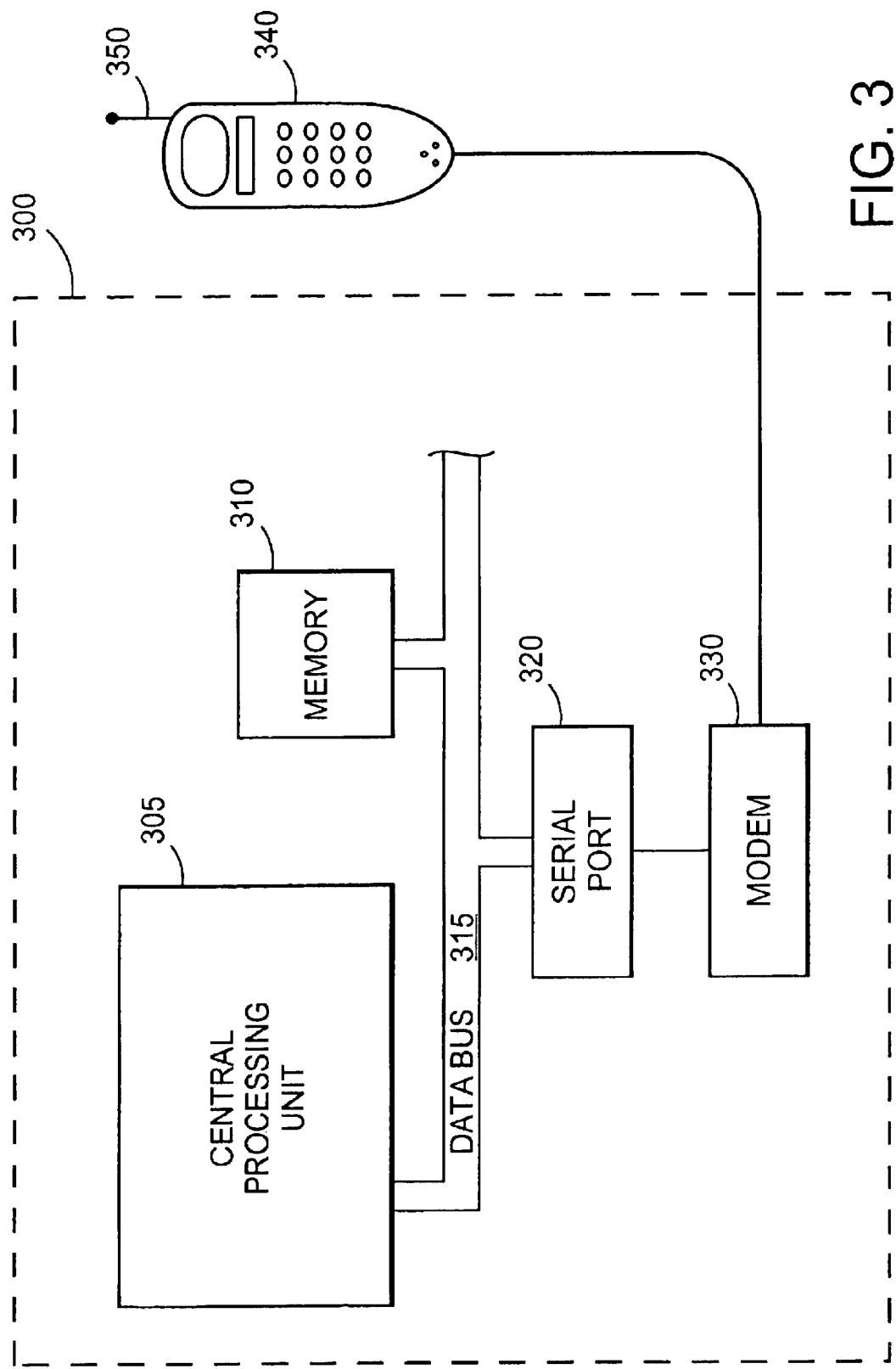

SUPPLY OF INSTANT GPRS TO MOBILE PHONE MANUFACTURERS

BACKGROUND

The present invention relates generally to radiotelephone communications and, more particularly, to a system and method for adapting the portable computer of an existing mobile station so as to be instantly capable of supporting packet-switched connections, e.g., GPRS.

When the personal computer market exploded during the early 1980's, these computers were used to perform individual, isolated tasks without communication with other computers except through the exchange of floppy disks. However, as the personal computer market developed, the need for communication between personal computers grew. One communication technology that rose to the forefront was modem technology. By connecting modems to their personal computers, users had the capability of directly transferring data between and communicating in real time with other communication devices. Such data transfers were commonly made through either a direct connection between the personal computers or via a telephone connection.

Certain standards have evolved for communicating between a computer and its attached modem. Physical links between these device are generally made through a serial or parallel communications port. One skilled in the art will appreciate that the computer sends certain commands through the physical link to the modem and, as a result, the modem returns certain responses. The de facto standard for these commands is the Hayes Microcomputer Products™ "AT" command set. This command set is well known in the art and includes such commands as the 'D' (Dial) command. The 'D' command requests the modem to dial a telephone number supplied in a dial string, e.g., 'ATD18075552691'. Such a command is hence interpreted by the modem as a request to set up a circuit-switched call to the indicated number.

While intercommunication between personal computers was on the rise, another need became evident, i.e., the need to communicate with remote systems through cellular connections. As technology became more sophisticated, personal computers were designed to be increasingly smaller. With the advent of laptop and notebook computers in the early 1990's, computer portability became possible. Portable computers allowed users to carry the computers from city to city, state to state, and even country to country. However, a problem still existed; while stationary machines can be conveniently connected to communication networks via a telephone line, portable computers lacked this capability during times when normal phone connections were not available. As a result, attempts have been made to combine cellular telephone technology with these portable devices in order to allow for distant communications. By connecting a portable computer (e.g., a laptop computer) to a cellular phone, one can access a telephone network in generally the same way as by directly hooking the computer to a telephone wall outlet. One skilled in the art will appreciate that the combination of a portable computer and cellular phone may be referred to as a "mobile station".

The cellular industry, by which these mobile stations communicate, has made phenomenal strides in commercial operations in the United States as well as the rest of the world. Growth in major metropolitan areas has far exceeded expectations and is rapidly outstripping system capacity.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems.

Continued advancements in the field of cellular technology, as well as other types of radiotelephone communications, have permitted the introduction of new services and new forms of communications. For instance, proposals have been set forth to provide existing cellular, and other communication networks, with the capability of communicating packet data. Unlike circuit-switched connections, packet-switched connections allow multiple users to share the same physical channel by providing routing information in a header attached to each payload of data. By sharing the same physical channel among multiple users, packet-switched connections tend to optimize bandwidth utilization for the relatively bursty data communication applications.

One such packet data system is the General Packet Radio Service (GPRS). A comprehensive description of GPRS is provided in the GSM Specification, GSM 03.60, version 6.1.0 which is incorporated by reference herein. GPRS uses a packet-mode technique to transfer high-speed and low-speed data and signalling in an efficient manner. As a result, a mobile station which supports GPRS would be capable of sending and receiving packet data.

Many different types of services have been implemented which benefit from the use of data packet communications. Such services include, for example, messaging services (e.g., electronic mail or facsimile transmissions), database retrieval services (e.g., retrieval of information from the World Wide Web) and distribution services (e.g., news, weather and stock services) which send data uni-directionally to multiple users.

It is desirable that existing mobile stations have the capability to support such services. As indicated above, existing mobile stations commonly include standardized modems which allow for data transfer via circuit-switched connections.

Many existing mobile stations fail to provide the capability to support GPRS. In order to instantly adapt a portable computer of an existing mobile station for such support requires enhancements be made to the operating system of the portable computer which would be not only time consuming, but also expensive.

SUMMARY

The present invention seeks to overcome the above-identified deficiencies by modifying a modem's standard AT command set so as to enable a portable computer of an existing mobile station to instantly support a packet-switched connection, e.g., GPRS. According to exemplary embodiments of the present invention, a GPRS identifier is added to the modem's dial command in order to indicate that GPRS is requested. The modification to the modem's dial command is made in such a way so as to be compliant with the well known syntax rules set forth for that command. By modifying the modem's AT command set accordingly, an existing mobile station's portable computer will be capable of instantly supporting GPRS irrespective of the off-the-shelf operating system in use in the portable computer.

BRIEF DESCRIPTION OF THE DRAWINGS

The above objects and features of the present invention will be more apparent from the following description of the preferred embodiments with reference to the accompanying drawings, wherein:

FIG. 3 illustrates the exemplary mobile station of FIG. 2 in more detail.

DETAILED DESCRIPTION

Figure 1:
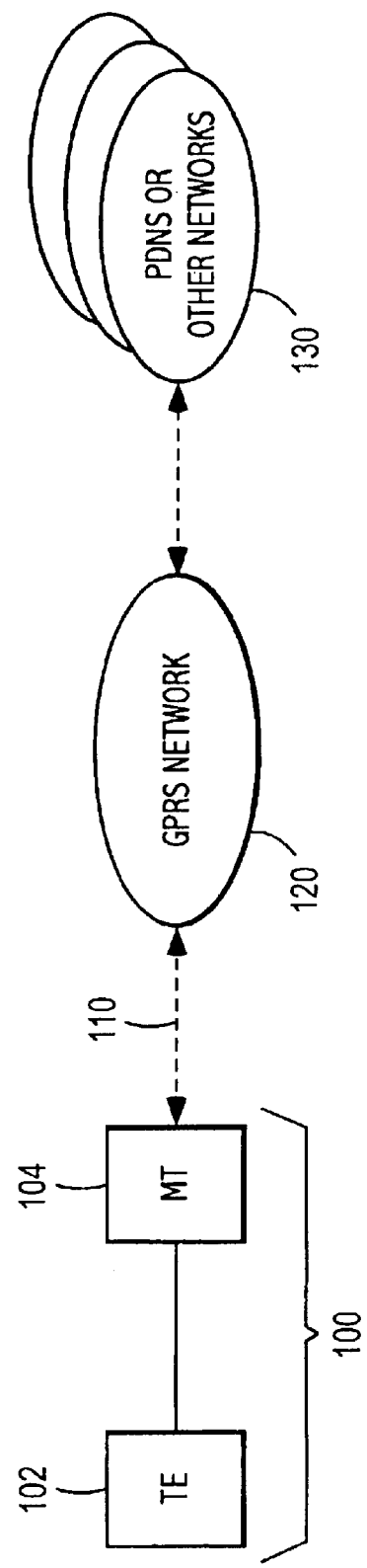
FIG. 1 illustrates an exemplary GPRS architecture in which the system and method of the present invention may be implemented.

FIG. 1 illustrates an exemplary GPRS architecture in which the system and method of the present invention may be implemented. The system set forth in FIG. 1 includes a mobile station 100, a GPRS network node 120 and a plurality of packet data or similar types of networks. As will be described in more detail below. the mobile station 100 is divided into terminal equipment 102 and a mobile termination unit 104. One skilled in the art will appreciate that the system of FIG. 1 would generally contain a plurality of mobile stations and GPRS network nodes; however, for the sake of brevity, only one of each is illustrated. Moreover, the system of FIG. 1 would generally include additional devices, such as a base station, which aid in the sending, receiving and/or processing of data.

In order for the mobile station 100 to access a GPRS service supplied by the GPRS network 120, the mobile station 100 must first make its presence known to the network by performing a GPRS attach procedure. This operation establishes a logical link between the mobile station 100 and the serving GPRS support node 120. This link makes the mobile station 100 available for short message service transfers over the GPRS node 120, paging, and notification of incoming GPRS data from one or more of the PDNs 130. One skilled in the art will appreciate that, in addition to the GPRS attach procedure, the mobile station must also activate a Packet Data Protocol (PDP) Context in order to ready the mobile station 100 for data packet transfers.

Figure 2:
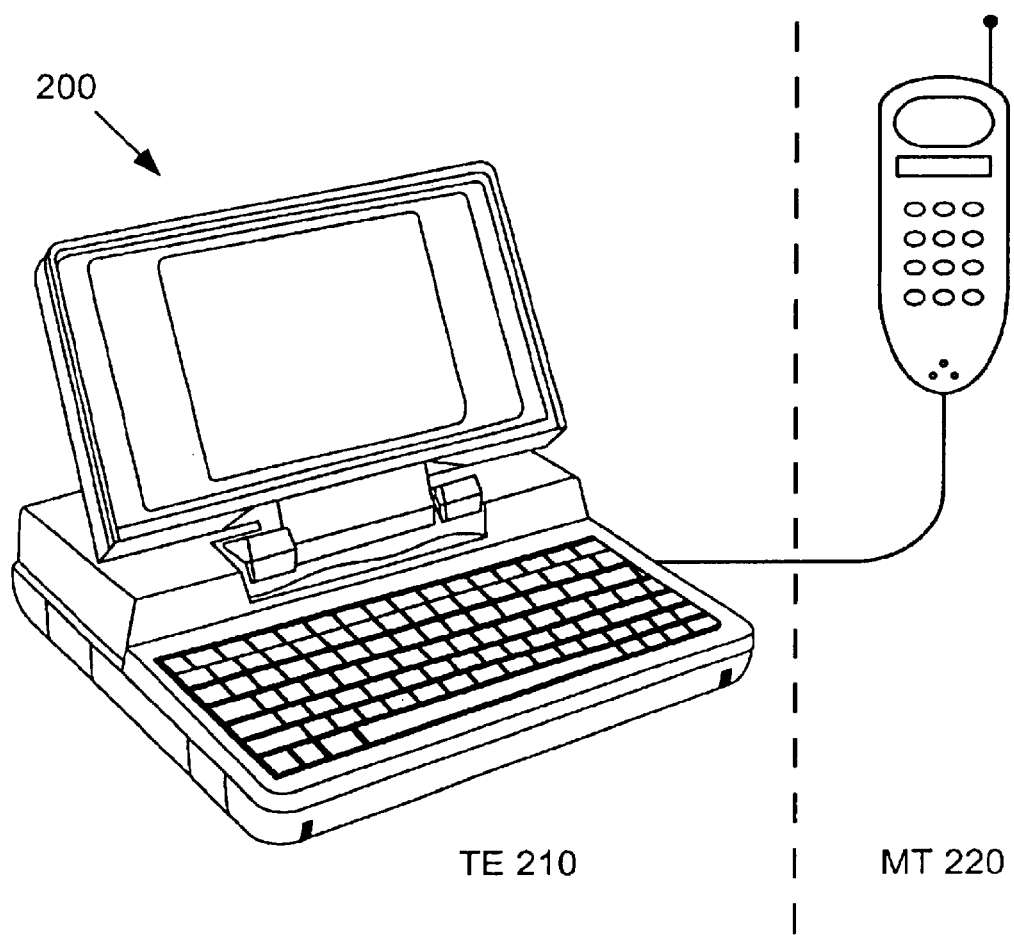
FIG. 2 illustrates an exemplary mobile station wherein the mobile terminal and terminal equipment are separate units.

FIG. 2 illustrates an exemplary mobile station in which the method of the present invention may be implemented. Similar to the mobile station described above with respect to FIG. 1, the mobile station 200 of FIG. 2 is divided into two physical entities, namely the terminal equipment (TE) 210 and the mobile termination (MT) 220. The TE 210 is typically contained within a laptop or other similar type of portable computer. The MT 220, on the other hand, is typically contained in a mobile phone. One skilled in the art will appreciate that the TE and MT may alternatively be integrated into a single device.

FIG. 3 illustrates the exemplary mobile station of FIG. 2 in more detail. In FIG. 3, an exemplary portable computer 300 includes a central processing unit 305 which is connected to a memory 310 and a serial port 320 via data bus 315. One skilled in the art will appreciate that the memory 310 contains an operating system (not shown) which is software that controls the allocation and usage of hardware resources such as memory, central processing unit time and peripheral devices (such as a modem). Portable computer 300 also includes a modem 330 which communicates via a cable with cellular telephone 340. The cellular telephone 340 transmits signals via antenna 350 in a well known manner. A mobile station, such as the one depicted in FIG. 3, would generally also include additional circuitry (not shown) which would aid in the sending, receiving and processing of data.

The serial port 320 acts as a channel for routing commands from the central processing unit 305 to the modem 330. According to exemplary embodiments of the present invention, the modem 330 uses the defacto standard Hayes Microcomputer Products™ "AT" command set.

According to the present invention, the AT command set is modified in order to provide a quick and inexpensive method in which to provide GPRS support to an existent mobile station's portable computer. As indicated above, the standard AT command set uses the 'D' command to request the modem to set up a circuit switched-call to the indicated number. The present invention modifies this 'D' command in order to initiate a GPRS data service in the same sense as the standard 'D' command would initiate a circuit-switched service.

In order for the modem to recognize that a GPRS data service is requested (as opposed to a circuit-switched call), a special GPRS identifier is used. The GPRS identifier is placed as a prefix in the dial string supplied with the 'D' command. According to an exemplary embodiment of the present invention, the user supplies the identifier in a manner similar to which a user supplies the phone number to be dialed according to the conventional technique for a circuit-switched connection; however, the "phone number" according to the present invention, includes the GPRS identifier. The rest of the "phone number" (hereinafter referred to as the "remainder") identifies a specific PDP context (e.g., 'Public Internet' or 'corporate network A') to be activated. Table 1 illustrates an exemplary dial string for a conventional circuit-switched connection compared to an exemplary dial string for a packet data connection of the present invention.

TABLE 1

| Type of Connection | Exemplary Dial String |
| --- | --- |
| Conventional circuit-switched | 'ATD18075552691' |
| Packet data | 'ATD*99*1234' |

As is evident from Table 1, the exemplary dial string for a packet data connection includes a GPRS identifier '*99*' and a remainder '1234'. One skilled in the art will appreciate that the use of '*99*' as the GPRS identifier is merely exemplary and that the GPRS identifier could be of any form which is compliant with the syntax rules for the 'D' command dial string.

Once the modem detects the GPRS identifier, it then looks to the remainder of the dial string. The interpretation of the remainder of the dial string is at the individual manufacturer's discretion. According to exemplary embodiments of the present invention, the remainder may identify a specific PDP Context (e.g., X.25 or IP) to be activated or, in the alternative, the remainder may be empty in which case a pre-defined PDP Context may be set to be activated. Irrespective of whether or not the remainder is empty, each remainder identifies a specific PDP Context with a specific parameter set-up. One identifier value might, for example, refer to a connection to an X.25 network 'A', another to an X.25 network 'B' and yet a third to a connection to a corporate IP network. The binding between identifier values and PDP contexts are either pre-defined in the mobile or made by the TE with a defined AT command.

It is evident from the above-described embodiments that the modified 'D' command of the present invention could be used to initiate the MT to perform a GPRS attach procedure as well as a PDP Context Activation. In addition, the command may also cause the MT to perform other operations necessary to begin actual data transfer, such as parameter negotiation and link protocol activation.

While the exemplary embodiments set forth above indicated that the user would supply the "phone number" (i.e., the GPRS identifier and remainder), one skilled in the art will appreciate that, as an alternative embodiment, a data network service provider, e.g., an Internet service provider, may supply special files which would alleviate the user from performing the above-described configuration. In this case, the user simply puts the given file in the correct folder.

By using the standard dial command ('D') for the GPRS service, according to the present invention, the use of standard, off-the-shelf operating systems, e.g., Microsoft's Windows 95™, can be used for accessing the GPRS service. The fact that the GPRS identifier of the present invention is specified so as to be compliant with the already-established syntax rules for the 'D' command dial string makes the use of the command for GPRS totally transparent to the operating system, i.e., no changes to existing software must be made. Hence, the use of the standard command alleviates portable computer manufacturers from supplying GPRS-capable portable computers and from the effort-consuming task of supplying specialized software for a large number of different operating systems.

The foregoing has described the principles, preferred embodiments and modes of operation of the present invention. However, the invention should not be construed as being limited to the particular embodiments discussed above. For example, while the above-described embodiments use the Hayes AT command set, one skilled in the art will appreciate that other modem commands sets could be implemented without departing from the spirit and scope of the present invention. In addition, although GPRS is used as an example, the present invention is equally applicable to any radiocommunication system wherein both circuit-switched and packet-switched connections are available. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for providing support for a data packet service to a mobile station comprising a modem, said method comprising the steps of:

sending an AT command dial string comprising a packet service identifier to said modem; and generating by said modem, in response to said AT command dial string, a request to initiate a General Packet Radio Service (GPRS) connection.

2. The method of claim 1 wherein said modem uses a Hayess™ "AT" command set and said command dial string is a 'D' command dial string.

3. The method of claim 1 wherein a radiocommunication system receives said request and, responsive thereto, establishes a packet-switched connection.

4. A mobile station comprising:

a central processing unit for sending an AT command dial string comprising a packet data service identifier; and a modem for receiving said AT command dial string and, in response thereto, generating a request to initiate a General Packet Radio Service (GPRS) connection.

5. The mobile station of claim 4 wherein said AT command dial string further comprises a remainder which identifies the specific Packet Data Protocol (PDP) Context to be activated.

6. The mobile station of claim 4 wherein said modem uses a Hayes™ "AT" command set and said command dial string is a 'D' command dial string.

7. The mobile station of claim 4 wherein said mobile station comprises a seperate terminal equipment (TE) and mobile termination (MT).

8. A method for providing support for a data packet service to a mobile station comprising a modem and a mobile termination unit, said method comprising the steps of:

sending an AT command dial string comprising a packet service identifier to said modem;

generating, by said modem, a request ti initiate a General Packet Radio Service (GPRS) connection in response to receipt of said packet service identifier;

sending said request to the mobile termination unit; and initiating, by said mobile termination unit, a packet-switched connection in response to receipt of said request.

9. The method of claim 8 wherein said initiating step comprises:

performing a GPRS attach procedure in response to said request.

10. The method of claim 8, wherein said initiating step comprises:

performing a GPRS attach procedure; and activating a specific Packet Data Protocol (PDP) Context.

11. The method of claim 10, wherein said AT command dial string further comprises a remainder which identifies the specific Packet Data Protocol (PDP) Context to be activated by said mobile termination unit.

12. A mobile station comprising:

a mobile termination unit;

a central processing unit; and a modem, wherein said modem is configured to:

receive an AT command dial string comprising a packet data service identifier from said central processing unit;

generate, in response to receipt of said packet data service identifier, a request to initiate a General Packet Radio Service (GPRS) connection; and send said request to the mobile termination unit.

13. The mobile station of claim 12, wherein said mobile termination unit is configured to perform a GPRS attach procedure in response to receipt of said request.

14. The mobile station of claim 13, wherein said mobile termination unit is configured to:

perform, in response to receipt of said request, a GPRS attach procedure; and activate a specific Packet Data Protocol (PDP) Context.

15. The mobile station of claim 14, wherein said AT command dial string further comprises a remainder which identifies the specific Packet Data Protocol (PDP) Context to be activated by said mobile termination unit.

* * * * *

UNITED STATES PATENT AND TRADEMARK OFFICE
CERTIFICATE OF CORRECTION

| | | |
|---|---|---|
| PATENT NO. | : 6,907,265 B1 | Page 1 of 1 |
| APPLICATION NO. | : 09/144079 | |
| DATED | : June 14, 2005 | |
| INVENTOR(S) | : Holmstrom et al. | |

It is certified that error appears in the above-identified patent and that said Letters Patent is hereby corrected as shown below:

Column 5, Line 62:  Please change "Hayess" to --Hayes--

Column 6, Line 23:  Please change "ti" to --to--

Signed and Sealed this

Eleventh Day of July, 2006

JON W. DUDAS
*Director of the United States Patent and Trademark Office*